Figure 1:
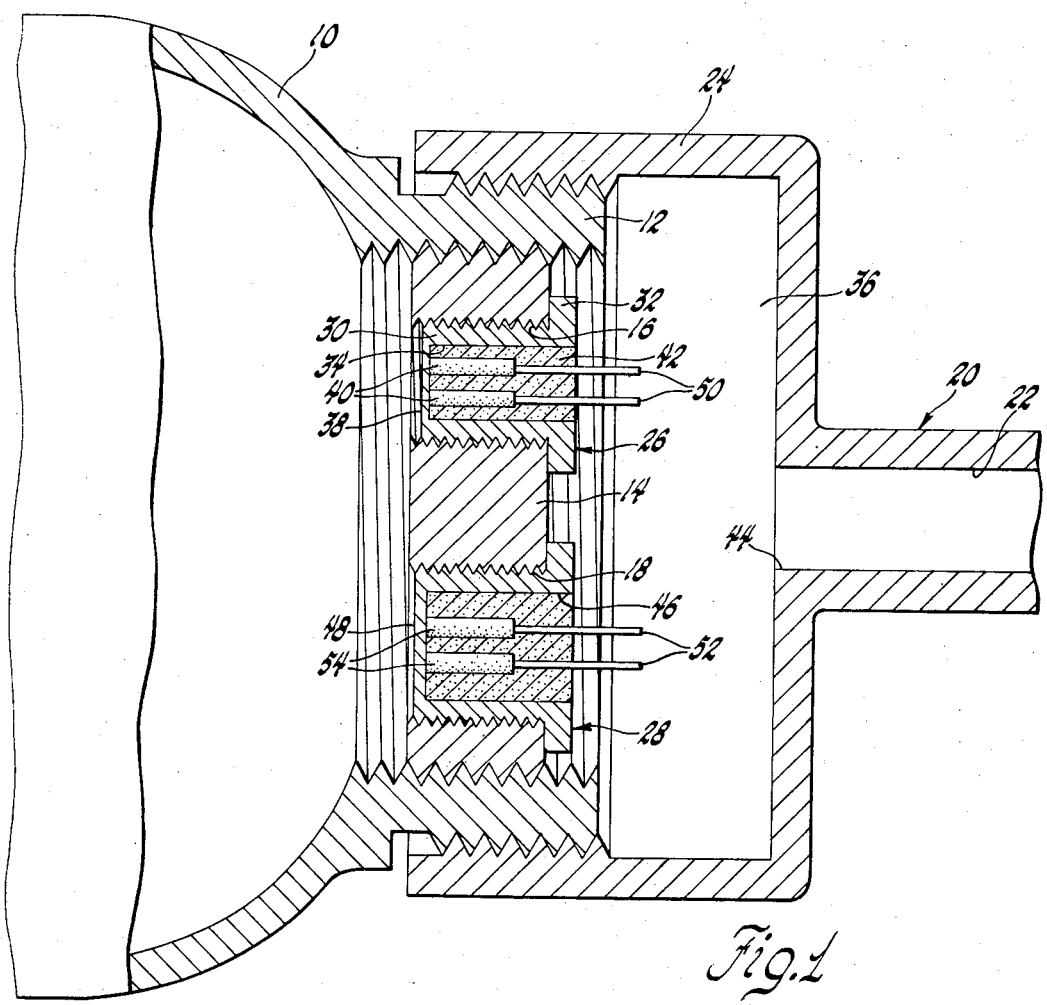

United States Patent [19]
Blanchard

[11] 3,713,667
[45] Jan. 30, 1973

[54] OCCUPANT RESTRAINT SYSTEM

[75] Inventor: Houston F. Blanchard, Greenfield, Wis.

[73] Assignee: General Motors Corporation, Detroit, Mich.

[22] Filed: Aug. 27, 1971

[21] Appl. No.: 175,577

[52] U.S. Cl. ................................280/150 AB, 222/3
[51] Int. Cl. ..............................................B60r 21/08
[58] Field of Search .......280/150 AB; 222/3; 137/67, 137/68

[56] References Cited

UNITED STATES PATENTS

| | | | |
|---|---|---|---|
| 3,420,572 | 1/1969 | Bisland | 280/150 AB X |
| 3,495,675 | 2/1970 | Hass et al. | 280/150 AB X |
| 3,532,358 | 10/1970 | Selwa et al. | 280/150 AB |
| 3,582,107 | 6/1971 | Goetz | 280/150 AB |
| 3,622,974 | 11/1971 | Best et al. | 280/150 AB X |
| 3,632,135 | 1/1972 | Chute et al. | 280/150 AB |
| 3,639,710 | 1/1972 | Haruna et al. | 280/150 AB |

*Primary Examiner*—Kenneth H. Betts
*Assistant Examiner*—George Steube
*Attorney*—W. E. Finken et al.

[57] ABSTRACT

A vehicle body occupant restraint system includes a source of pressure fluid, an inflatable occupant restraint cushion, and a passage communicating with the cushion and having an orifice of predetermined flow area. An end wall of the pressure vessel includes a pair of plugs, each comprising an externally threaded hollow body threaded into a threaded opening of the end wall. The bores of the plugs are located parallel of each other and communicate in series with the passage orifice through an antechamber of a member containing the passage and opening to the bores of the plugs. The bore of one plug is of lesser predetermined flow area than the passage orifice, and the bore of the other is of greater predetermined flow area than the passage orifice. Each plug bore is closed to the pressure vessel by a diaphragm rupturable by electrically fired detonators. At vehicle impacts above a predetermined minimum level of intensity and below a predetermined maximum level, the detonators of the one plug are fired and the bore of the one plug controls the flow rate to the cushion. Upon impact levels of intensity above the predetermined maximum, the detonators of both plugs are fired and the passage orifice controls the rate of flow to the cushion. The latter rate of flow is the normal rate of flow so that the cushion inflates during the normal time period. The former rate of flow is reduced so that the time period of inflation is increased.

1 Claim, 2 Drawing Figures

PATENTED JAN 30 1973

3,713,667

INVENTOR.
Houston F. Blanchard
BY
Herbert Furman
ATTORNEY

OCCUPANT RESTRAINT SYSTEM

This invention relates generally to vehicle occupant restraint systems and more particularly to a multilevel vehicle occupant restraint system including an occupant restraint cushion which is inflatable from a source of pressure fluid at various rates in accordance with predetermined levels of intensity of vehicle impact.

Copending application Ser. No. 175,661, Thomas H. Vos, Occupant Restraint System, filed Aug. 27, 1971, discloses a multiple level occupant restraint system wherein the flow rate of pressure fluid to a cushion and consequently the time period of cushion inflation is set at a predetermined level by selective operation of serially disposed flow control orifices in accordance with predetermined levels of intensity of impact.

The system of this invention differs in providing selectively operable parallel disposed inlet orifices which communicate in series with an outlet orifice communicating with the cushion. One of the inlet orifices is of lesser flow area than the outlet orifice and, when operative, controls the rate of flow of pressure fluid to the cushion and consequently the time period of inflation thereof. This orifice is selectively operated by a control arrangement when the level of intensity of impact is above a predetermined minimum and below a predetermined maximum. When the level of intensity is above the predetermined maximum, the other inlet orifice is additionally operated by the control arrangement to provide for increased flow of pressure fluid to the cushion so that the cushion inflates in the normal time period. The other inlet orifice has a flow area greater than that of the outlet orifice whereby the outlet orifice controls the rate of flow when both inlet orifices are operated. Each orifice is closed by a detonator rupturable diaphragm. The detonators are electrically fired by a control arrangement in accordance with predetermined levels of intensity of impact sensed thereby.

The primary feature of this invention is that it provides a multiple level vehicle occupant restraint system wherein a source of pressure fluid and an inflatable cushion are interconnected by selectively operable parallel disposed inlet orifices communicating in series with an outlet orifice, one inlet orifice having a flow control area less than that of the outlet orifice and being selected by a control arrangement to limit the rate of flow through the outlet orifice when the level of intensity of impact of the vehicle falls within a predetermined range, the other inlet orifice having a flow control area greater than the one and the outlet orifice and being additionally selected by the control arrangement to increase the rate of flow through the outlet orifice when the level of intensity is above the predetermined range.

Figure 2:
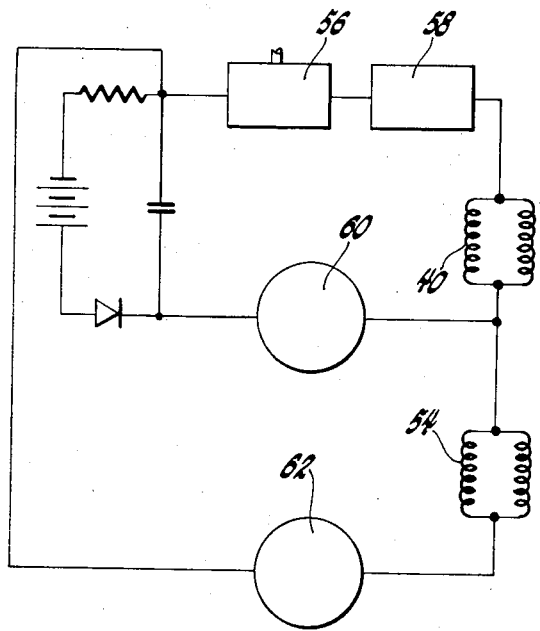

This and other features of the restraint system of this invention will be readily apparent from the following specification and drawings wherein:

FIG. 1 is a view of an occupant restraint system according to this invention; and FIG. 2 is a schematic of the control arrangement.

Referring now to FIG. 1 of the drawings, a pressure vessel designated generally 10 forms part of a conventional vehicle occupant restraint system. Since the details of such system are conventional and not necessary to an understanding of this invention, they are not disclosed herein. Reference may be had to the aforenoted Vos application for such details. Although a pressure vessel has been disclosed in conjunction with the subject occupant restraint system, it will be apparent, of course, that a gas generator or an air-augmented system may likewise be used.

The cylindrical outlet neck 12 of the pressure vessel is internally and externally threaded. The internal threads receive an externally threaded cylindrical closure 14 provided with a pair of threaded bores 16 and 18. A conventional diffuser and manifold assembly 20 includes a passage 22 which communicates with an inflatable cushion, not shown. The manner in which passage 22 communicates with the inflatable cushion is not shown but is conventional, and reference may be had to Ser. No. 142,533 Noll et al., filed May 12, 1971, and Ser. No. 11,189 Cole, filed Feb. 13, 1970, now U.S. Pat. No. 3,610,657 for the details. The enlarged cylindrical end 24 of assembly 20 is internally threaded and receives neck 12 as shown. Suitable seals may be provided between the assembly 20 and the pressure vessel.

The threaded bores 16 and 18 each receive respective plug assemblies 26 and 28. Such plug assemblies are the same in structure and function, although dimensionally different. The plug assembly 26 includes an externally threaded plug body 30 which is received within bore 16 and a hex or similar head 32 engaging the outer wall of closure 14. The body 30 includes an internal cylindrical bore 34 which opens at one end through the head 32 to the antechamber 36 defined by end 24 of assembly 20. The other end of bore 34 is closed by an integral rupturable diaphragm 38 which may be conventionally scored in X or cruciform fashion. The diaphragm 38 blocks flow of pressure fluid between the pressure vessel 10 and the passage 22. A pair of conventional electrically fired detonators 40 are received within the bore 34 in engagement with the diaphragm 38. The detonators are retained in place by conventional stemming material 42 which fills the bore.

The diameter of the bore 34 is less than that of the passage 22. Thus, if diaphragm 38 is ruptured, the rate of flow from the pressure vessel 10 to the cushion through the passage 22 and the time period of the inflation of the cushion is controlled by bore 34. Bore 34 thus provides a first flow control inlet orifice in series with the outlet orifice 44 of antechamber 36 or inlet of passage 22.

The plug 28 is structurally the same as the plug 26 but dimensionally larger so that the bore 46 of such plug is of larger diameter than the diameter of bore 34 but of less diameter than orifice 44. Thus, when diaphragm 48 is ruptured and pressure fluid flows from the pressure vessel 10 through both bores 34 and 46, the rate of flow and the consequent time period of inflation of the cushion will be controlled by the orifice 44. Bore 46 thus provides an inlet orifice in parallel with that provided by bore 34 and in series with orifice 44.

The firing wires 50 of the detonators 40 and 52 of the detonators 54 of plug 28 extend outwardly through conventional stemming material filling bores 34 and 46 and are connected to a control system or arrangement schematically shown in FIG. 2 for firing the detonators in accordance with the level of intensity of vehicle impact. The control system is only briefly disclosed herein since it is the same as that disclosed in detail in copending application Ser. No. 175,576, Trevor O. Jones, filed Aug. 27, 1971. The control system includes a pressure transducer 56 actuated by an energy absorbing bumper system and an amplifier 58 connected in series with an inertial sensor 60 across the detonators 40 and a source of potential.

The pressure transducer 56 is actuated when the level of intensity of the impact forces applied to the impact bar of the energy absorbing bumper system exceeds the absorption capability of the system and there is a likelihood or probability that deformation of the vehicle will occur. The inertial sensor 60 is set at a level so as to be actuated by the impact forces at approximately the same time that the transducer is actuated and prior to the onset of vehicle deformation. Thus, if the level of intensity of impact forces is above a predetermined minimum required for actuation and below a predetermined maximum, as will be explained, the detonators 40 will be fired to remove the diaphragm 38. The flow of pressure fluid to the cushion will be controlled by bore 34 and limited to a rate less than the normal flow rate so that the time period of inflation of the cushion will be greater than normal.

The control system also includes a second inertial sensor 62 connected in series with the first inertial sensor 60 and with the detonators 54 across the source of potential. The sensor 62 is of the same structure as sensor 60 but is set so as to be actuated only when the level of intensity of the impact forces is above the predetermined maximum. In such instance, the sensor 60 and the transducer 56 would likewise be energized such that the detonators 40 would be fired concomitantly with the detonators 54. The diaphragm 48 will thus be removed with the diaphragm 38 so that pressure fluid will flow from the pressure vessel 10 through both bores 34 and 46. However, the flow rate through passage 22 to the cushion is controlled by the orifice 44. Thus, the flow rate and the time period of inflation are normal.

Thus, this invention provides an improved occupant restraint system of the multiple level type wherein a pair of inlet orifices are connected in parallel with each other and in series with an outlet orifice to provide for predetermined rates of flow of pressure fluid from a source to an inflatable cushion in accordance with predetermined levels of intensity of vehicle impact.

I claim:

1. In a vehicle occupant restraint system including sensor means operative to sense the intensity of vehicle body impacts, a source of pressure fluid, and an inflatable occupant restraint cushion, the combination comprising, an outlet orifice of predetermined flow area communicating with the cushion, a first inlet orifice communicating in series with the outlet orifice and being of lesser predetermined flow area than the outlet orifice to control the flow of pressure fluid therethrough from the source to the cushion, a second inlet orifice in parallel with the first inlet orifice and in series with the outlet orifice, the outlet orifice having a flow area less than that of the second inlet orifice to control the flow of pressure fluid therethrough from the source to the cushion, and control means directing the flow of pressure fluid through the first and second inlet orifices in accordance with predetermined levels of intensity sensed by the sensor means, the control means directing the flow of pressure fluid through the first inlet orifice upon a level of intensity above a predetermined minimum and below a predetermined maximum being sensed by the sensor means, the control means additionally directing the flow of pressure fluid through the second inlet orifice upon a level of intensity above the predetermined maximum being sensed by the sensor means.

* * * * *